(12) United States Patent
Yuito et al.

(10) Patent No.: US 6,937,445 B2
(45) Date of Patent: Aug. 30, 2005

(54) RECORDING/REPRODUCING SEPARATED TYPE HEAD WITH HEAT RADIATING STRUCTURE

(75) Inventors: Isamu Yuito, Odawara (JP); Kiyoshi Akamatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 138 days.

(21) Appl. No.: 10/368,572

(22) Filed: Feb. 20, 2003

(65) Prior Publication Data

US 2003/0223156 A1 Dec. 4, 2003

(30) Foreign Application Priority Data

May 30, 2002 (JP) ........................................ 2002-156634

(51) Int. Cl.[7] .............................................. G11B 5/39
(52) U.S. Cl. ........................................ 360/317; 360/319
(58) Field of Search ................................. 360/317, 319

(56) References Cited

U.S. PATENT DOCUMENTS 6,025,977 A * 2/2000 Hu et al. .................... 360/319
6,724,569 B1 * 4/2004 Chen et al. ................. 360/119

OTHER PUBLICATIONS

L. Pust et al, "Thermomechanical Head Performance", IEEE Transactions on Magnetics, vol. 38, No. 1, Jan. 2002, pp. 101–106.

* cited by examiner

Primary Examiner—A. J. Heinz
(74) Attorney, Agent, or Firm—Mattingly, Stanger, Malur & Brundidge, P.C.

(57) ABSTRACT

An area in which an insulating film is formed over a substrate of a recording/reproducing separated type head is limited to the vicinity of a GMR film. This enables heat of Joule heating by a coil to be guided to the substrate without being obstructed by the insulating film. Electrodes, an upper shield film, a lower shield and a lower pole that are formed in-between are metallic thin films of high thermal conductivity, and accordingly have little influence. Similarly, gap films and a separation film that are positioned in-between, though they are electrically insulating films made of $Al_2O_3$, have no great influence because of their thinness. According to the invention, a rise of the head's own temperature is restrained by efficiently radiating heat generated by the head itself to the substrate. As a result, it is thereby made possible to provide a highly reliable recording/reproducing separated type head whose deformation quantity is smaller and which can avoid coming into contact with a recording medium.

8 Claims, 8 Drawing Sheets

RECORDING/REPRODUCING SEPARATED TYPE HEAD WITH HEAT RADIATING STRUCTURE

BACKGROUND OF THE INVENTION

1. Field of the Invention

The present invention relates to a recording/reproducing separated type head and an inductive magnetic thin film head for use in magnetic disk apparatuses.

2. Description of the Prior Art

Along with the capacity enlargement of magnetic disk apparatuses, the requirement for higher recording densities is increasing year after year. The apparatuses are required to be smaller and slower in circumferential speed. To meet these requirements, state-of-the-art magnetic disk apparatuses use a giant magnetoresistive (GMR) film, and their recording track width has been reduced less than 0.4 μm and their gap between the head and the recording medium (hereinafter referred to as the flying height), to 15 nm, both approximately.

FIG. 3 shows a perspective view of a recording/reproducing separated type head using a GMR head. The recording/reproducing separated type head has a structure in which an inductive magnetic thin film head for recording use is stacked over a GMR head exclusively for reproducing use. The recording/reproducing separated type head shown here is known as an upper shield/lower pole merged type, and an upper shield film 8 constituting the GMR head also serves as the lower pole of the inductive magnetic thin film head for recording use.

FIG. 4 shows a section of the upper shield/lower pole merged type recording/reproducing separated type head according to the prior art. Its reproducing GMR head comprises the upper shield film 8, a lower shield film 3, both for excluding all other magnetic fields than those of desired signals, a GMR film 5 for detecting desired signals, electrodes 6 for flowing currents to the GMR film 5, an upper gap film 7 and a lower gap film 4. On the other hand, the inductive magnetic thin film head for recording use comprises an upper pole 14 for generating a recording magnetic field, a coil 12 for applying a signal current and an interlayer insulator 13. These films constituting the heads are fabricated over a substrate 1 over which an insulating film 2 is stacked. Further, the whole head element is covered with a protective film 15.

In contrast to the upper shield/lower pole merged type recording/reproducing separated type head described above, an upper shield/lower pole separated type recording/reproducing separated type head is shown in FIG. 5. In this head, an insulating separation film 9 and a recording lower pole 10 are additionally formed over the upper shield film 8.

Unlike in the upper shield/lower pole merged type, as the recording magnetic field of the inductive magnetic thin film head is separated by the separation film 9 in the separated type head, it is difficult to impress the GMR head, which is an advantage to stabilizing the electric properties. However, there is also a disadvantage of complicating the manufacturing process.

The substrate 1 is usually a sintered product of $Al_2O_3$ and TiC powder, whose surface has many fine pores (gaps). The insulating film 2 is intended to fill these gaps, which are filled by lapping $Al_2O_3$ after coated it by sputtering. For the lower shield 3 and the upper shield film 8 constituting the reproducing GMR head, thin films of NiFe or some other alloy are used. The giant magnetoresistive (GMR) film 5 for detecting signals consist of very thin spin valve films stacked one over another, having a CoFe free layer. The upper gap film 7 and the lower gap film 4 usually consist of $Al_2O_3$ thin films. The electrodes 6 consist of Ta layer which is hard on their sides exposed to the air bearing surface opposite the medium and, within the element, of Au, Cu and so forth, laminated to reduce the electric resistance.

On the other hand, the upper pole 14 constituting the inductive magnetic thin film head for recording use is made of a CoNiFe alloy thin film, which has a high saturation magnetic flux density and can generate a large recording magnetic field. The coil 12 for applying a recording current is made of Cu. The interlayer insulator 13 for insulating coils from each other or the coils from the upper pole 14 is made of a high molecular resin. The protective film 15 is made of an $Al_2O_3$ film.

As noted above, the gap between the heads and the recording medium is increasingly narrowed with the rise in recording density. In order to achieve a high density of recording, the heads indispensably need to be lowered in flying height. However, along with the lowering of the flying height, the deformation of heads is posing an increasingly serious problem, because the deformation of heads would invite localized narrowing of the gap between the heads and the recording medium, and there would be a case that the heads and the recording medium would collide, which would in the worst case result in signal disappearance due to damaging of the recording medium or sliding of the heads. Studies on this problem include, for instance, what is reported in the IEEE Transaction on Magnetics, vol. 38, No. 1, JANUARY 2002, page 101. According to this article, heads are deformed by heating and, for example, warped immediately above the upper pole 14 as shown in FIG. 6 (deformed portion 20). As a consequence, the deformed portion 20 would become more liable to contact with the recording medium, and in the worst case the deformed portion 20 would be worn as shown in FIG. 7 (worn area 21).

Heads can be deformed by differences among their constituent layers in the ratio of expansion when the heads are heated. The heating of the heads in turn would be due to their ambient temperature or their own heat generation. Among the factors of ambient temperature, the temperature within the magnetic disk apparatus is dominant. Many magnetic disk apparatuses are guaranteed against a temperature of about 60° C. The self-generated heat of the heads mainly comes from the inductive magnetic thin film head, and its major factors include Joule heating due to the resistance of coils at the time of writing, eddy current heating in the high frequency region, iron loss and an increase in resistance by the skin effect.

To reduce the self-generated heat of heads, one of the first conceivable ways is to work on the source of heat. For instance, it would be effective to suppress Joule heating by reducing the resistance of coils.

At the same time, it is also effective to facilitate heat radiation and thereby make it difficult for the heads to generate heat. For example, a radiator plate may be provided near the source of heat to facilitate heat radiation and keep the head elements themselves from generating heat.

As described above, the self-generated heat of the heads mainly comes from the inductive magnetic thin film head. Therefore, an essential challenge is how to effectively radiate heat due to, for instance, the Joule heating of the coil 12 and the hysteresis heating of the upper pole 14 and the lower pole 10.

In order to ensure satisfactory heat radiation, it is desirable to arrange films having a high thermal conductivity near the sources of heat generation. Incidentally, the recording/reproducing separated type head is mounted over an $Al_2O_3$ and TiC substrate having a large heat capacity and a high thermal conductivity. Thus the point is how to cause the substrate to radiate the heat generated by the inductive magnetic thin film head, and therefore how to bring the source of heat generation and the substrate close to each other poses an essential challenge.

As schematically shown in FIG. 4, in the current practice, the head element of the recording/reproducing separated type head and the substrate 1 are separated from each other by the insulating film 2, which may consist of $Al_2O_3$ (alumina) for example. It has already been explained that this separation is intended to fill the pores (gaps) which are formed because the substrate 1 is made of a sintered product. Unless these gaps are filled with $Al_2O_3$ (alumina), the magnetic properties of the magnetic thin films formed over them, such as the lower shield 3 and the GMR film 5, will become deteriorated, eventually with an adverse consequence on the electric properties and life of the head. The thickness of this insulating film 2 is usually a few μm or more. Furthermore, since the inductive magnetic thin film head is formed over a magnetoresistive head, it is formed around 10 μm away from the substrate 1 in the conventional recording/reproducing separated type head.

As described above, the heat generating portions of the inductive magnetic thin film head, including for instance the coil 12, are formed over a number of film layers, which obstruct heat radiation.

SUMMARY OF THE INVENTION

An object of the present invention is to provide a highly reliable recording/reproducing separated type head capable of preventing the deformation of magnetic heads, whose influence becomes significant with a decrease in the flying height of magnetic heads, which is an indispensable requirement for high density recording, and thereby preventing them from coming into contact with the recording medium.

With a view to achieving the object stated above, in the recording/reproducing separated type head according to the invention, an inductive magnetic thin film head, which does not disturb magnetic properties so that electric properties may not be affected and is a source of heat generation, is formed as close as practicable to a substrate having a large heat capacity and a high thermal conductivity.

More specifically, in a recording/reproducing separated type head comprising a magnetoresistive type head having between a lower shield and an upper shield, formed over a substrate, a magnetoresistive film and a pair of electrodes electrically connected to the magnetoresistive film, and an inductive thin film head having between a lower pole and an upper pole, formed adjacent to the magnetoresistive type head, a gap film and a coil via an interlayer insulator, an insulating film is formed between the substrate and the lower shield, and this insulating film is formed in the vicinity of the magnetoresistive film.

The lower shield may be formed on the insulating film over the substrate.

It is effective not to form the insulating film provided over the substrate in most of the area underneath the coil.

It is also effective for the insulating film provided over the substrate to be not more than 1 μm in thickness.

In order to supply such a head whose deformation is restrained and which is highly reliable even at a low flying height, it is essential to minimize the temperature rise of the head itself. According to the present invention, the rise of the head's own temperature is restrained by improving the heat radiating structure, and it is thereby made possible to supply a head less susceptible to deformation.

DETAILED DESCRIPTION OF PREFERRED EMBODIMENTS

[Embodiment 1]

Figure 1:
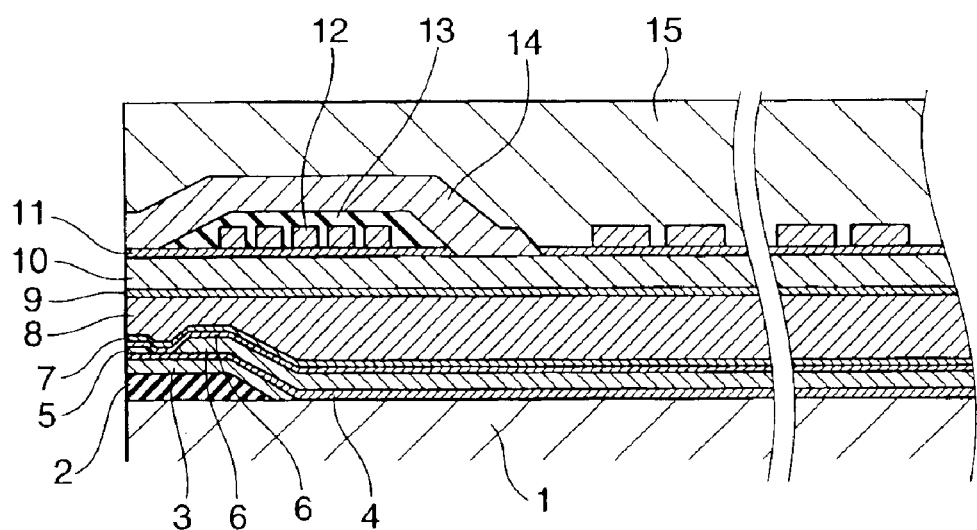
FIG. 1 shows a section of a recording/reproducing separated type head, which is a first preferred embodiment of the present invention.
Figure 4:
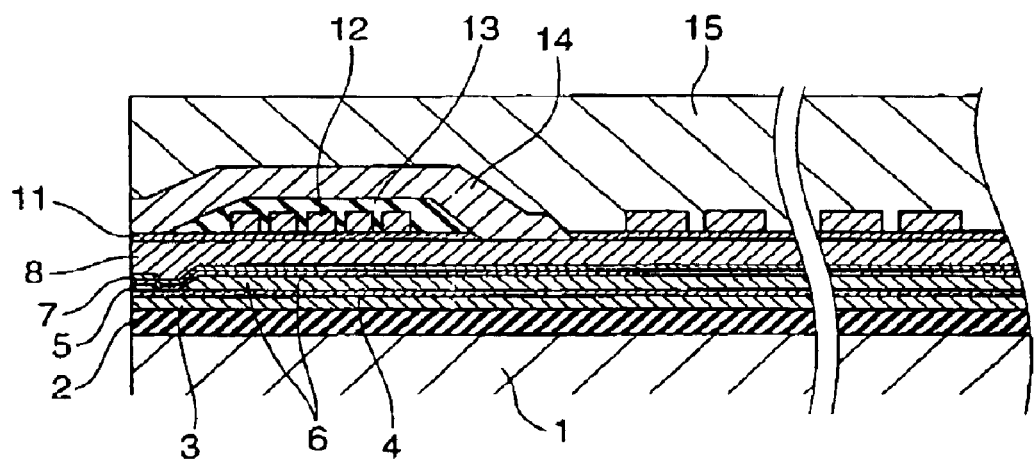
FIG. 4 shows a section of the recording/reproducing separated type head according to the prior art.
Figure 5:
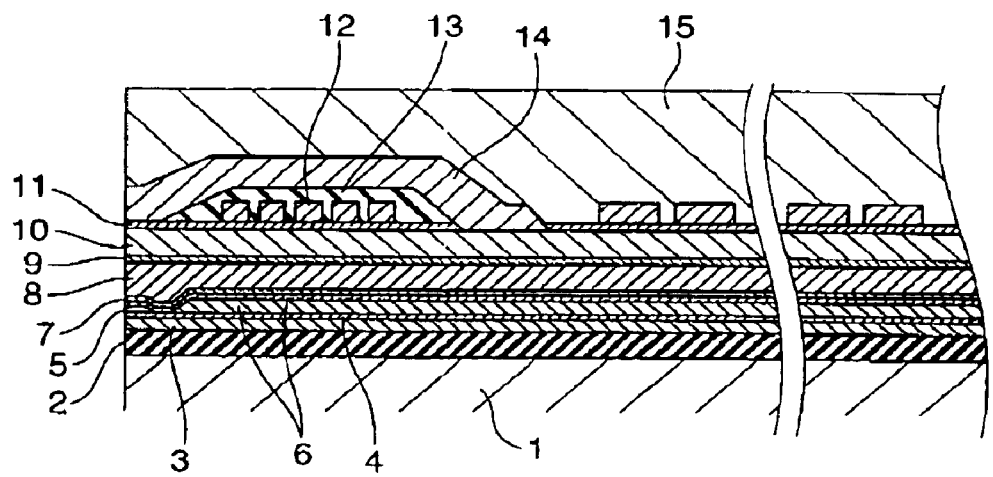
FIG. 5 shows a section of a recording/reproducing separated type head according to the prior art.

FIG. 1 is a sectional view showing in detail the configuration of an upper shield/lower pole separated version of recording/reproducing separated type head, which is Embodiment 1 of the present invention. In the recording/reproducing separated type head according to the prior art shown in FIG. 4 and FIG. 5, the insulating film 2 is formed all over the substrate 1. In this embodiment, the area in which the insulating film 2 is formed is limited to the vicinity of the GMR film 5. It is the same as what is shown in FIG. 5 in all other respects of the configuration. This configuration enables the heat of Joule heating by the coil 12 to be guided to the substrate 1 without being obstructed by the insulating film 2. The electrodes 6, the upper shield film 8, the lower shield 3 and the lower pole 10 that are formed in-between are metallic thin films of high thermal conductivity, and little affects the escape of heat generated in the coil 12 to the substrate 1. Similarly, the gap films 4, 7 and 11 and the separation film 9, though they are electrically insulating films made of $Al_2O_3$, have no great influence because of their thinness. Needless to mention, the fewer the films formed underneath the coil 12, the more the heat radiation facilitated.

The configuration of the recording/reproducing separated type head of Embodiment 1 shown in FIG. 1 will be described below with reference to the manufacturing process thereof.

(1) The substrate 1 is made of $Al_2O_3$ and TiC. First, the insulating film 2 is formed over the substrate 1. The insulating film 2, an $Al_2O_3$ thin film is formed by sputtering. The film thickness is 5 μm.

(2) The surface of this insulating film 2 is lapped until its thickness is reduced to 3±0.4 μm. This results in filling the gaps in the $Al_2O_3$ and TiC substrate 1 with $Al_2O_3$ and the smoothing of its surface.

(3) Then, the insulating film 2 is patterned to remove superfluous Al$_2$O$_3$. The patterning is carried out by ion milling with a photoresist film being used as the mask.

Through these steps, the insulating film 2 underneath the coil 12, which is a source of heat generation, is removed.

(4) This is followed by the formation of the lower shield film 3 over the insulating film 2. The material is NiFe. At this step, the lower shield film 3 is formed by plating with a photoresist film being used as the mask. The film thickness is 2 μm.

(5) Further, the lower gap film 4 is formed by sputtering. The film thickness is 0.1 μm and the material, Al$_2$O$_3$. After the film formation, through holes and other items necessary for the formation of signal input/output terminals are formed. The patterning is carried out by ion milling with a photoresist film being used as the mask.

(6) Next, the GMR film 5 is formed, the most essential element for signal detection. The GMR film 5 is formed by sputtering. The GMR film is a spin valve film with a CoFe thin film as the free layer. It is later patterned into a prescribed shape. The patterning is carried out by ion milling as at the foregoing step.

(7) The electrodes 6 are formed over both ends of the GMR film 5 and the lower gap film 4 by lifting off. The material is a Ta/TaW alloy multi layer, and the film thickness is 0.3 μm and 0.01 μm, respectively.

(8) Then, the upper gap film 7 is formed by sputtering. The film thickness is 0.1 μm and the material, Al$_2$O$_3$. The film formation is followed by the formation of through holes and the like. The patterning is carried out by ion milling with a photoresist film being used as the mask.

(9) Further, the upper shield film 8 is formed over the upper gap film 7 by plating with a photoresist film being used as the mask. The material is an NiFe alloy, the same as that for the lower shield film 3. It is desirable to flatten the upper surface of the upper shield film 8 by lapping or otherwise.

The GMR head section for reproduction use is formed through steps (1) to (9) described above. The manufacturing process of the inductive magnetic thin film head for recording use will now be described.

(10) First, the separation film 9 is formed to magnetically separate the inductive magnetic thin film head for recording use and the reproducing GMR head from each other. Here, it is an Al$_2$O$_3$ film of 0.3 μm in thickness, formed by sputtering. This prevents any recording magnetic field from being impressed directly on the GMR head, whose electric properties are thereby stabilized.

(11) Next, the lower pole 10 is formed by plating with a photoresist film being used as the mask. The material is an NiFe alloy.

(12) Then, the gap film 11 is formed by sputtering. It is an Al$_2$O$_3$ film of 0.2 μm in thickness.

(13) This is followed by the formation of the coil 12 within the interlayer insulator 13. The coil 12 is formed of Cu by plating with a photoresist film being used as the mask. The number of turns of the coil 12 is 11. The interlayer insulator 13 is coated with photoresist by spinning, and the internally contained gas is discharged by heating at a high temperature to achieve thermal stability.

(14) Further, the upper pole 14 is formed by plating. A pattern of 0.3 μm in track width on the air bearing surface of the medium is formed. The material is a CoNiFe alloy capable of generating a strong recording magnetic field.

(15) Next, the protective film 15 is formed by sputtering. The thickness of the film formed is 60 μm, reduced to a final thickness of 50 μm by lapping.

Figure 6:
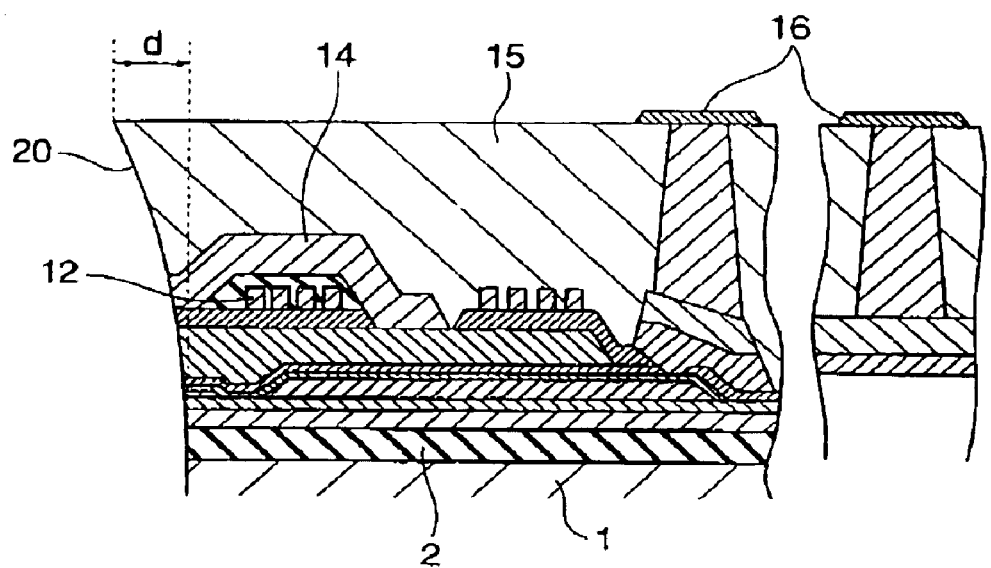
FIG. 6 shows a section of a recording/reproducing separated type head according to the prior art when deformed by heating.
Figure 7:
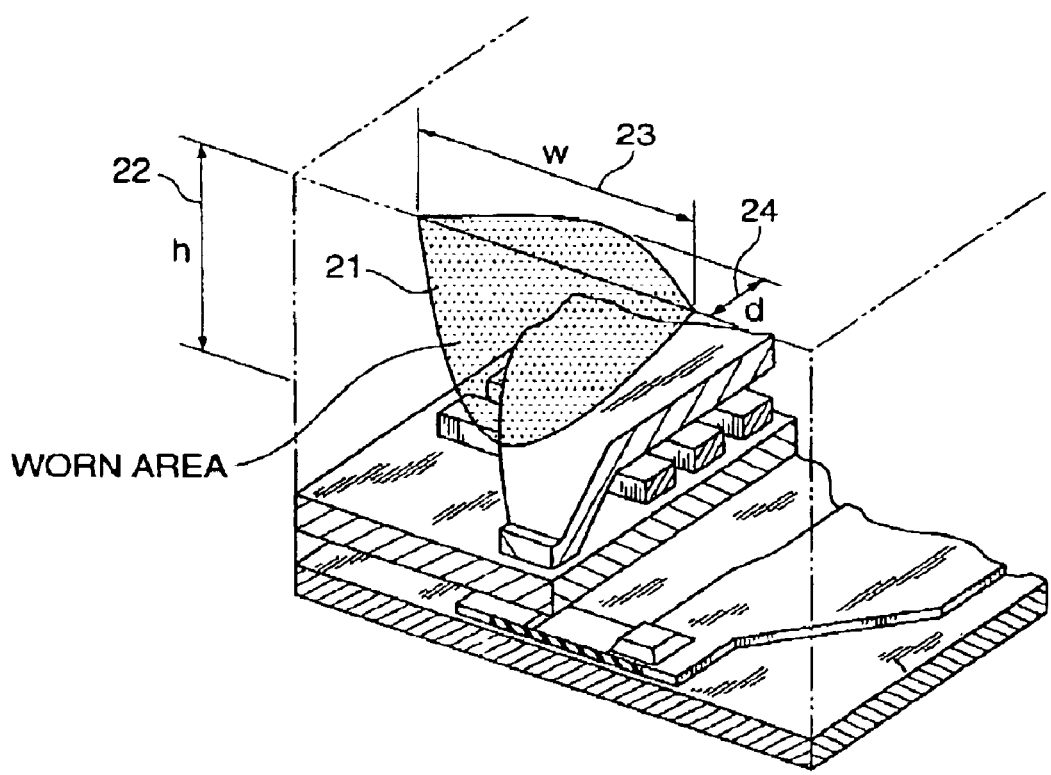
FIG. 7 shows a perspective view of a recording/reproducing separated type head according to the prior art in a state of being worn by deformation.

(16) Finally, terminals 16 for signal input/output as shown in FIG. 6 are formed to complete the head.

The recording/reproducing separated type head consisting of the inductive magnetic thin film head and the GMR head is formed by the process hitherto described.

In the recording/reproducing separated type head embodying the invention in this mode, the almost whole area of the inductive magnetic thin film head for recording use is formed where there is no insulating film 2. This results in suppressing the head temperature rise as, for instance, heat due to Joule heating of the coil 12 is efficiently transferred to the substrate 1. The temperature rise in a case where a current of 100 MHz and 30 mAp-p, for instance, is flowed to the coil 12 is 12.5° C. less than that in the presence of the insulating film 2. The effect is even more efficient where a current of 400 MHz and 30 mAp-p is applied, a reduction by 15° C. being achieved.

[Embodiment 2]

Figure 2:
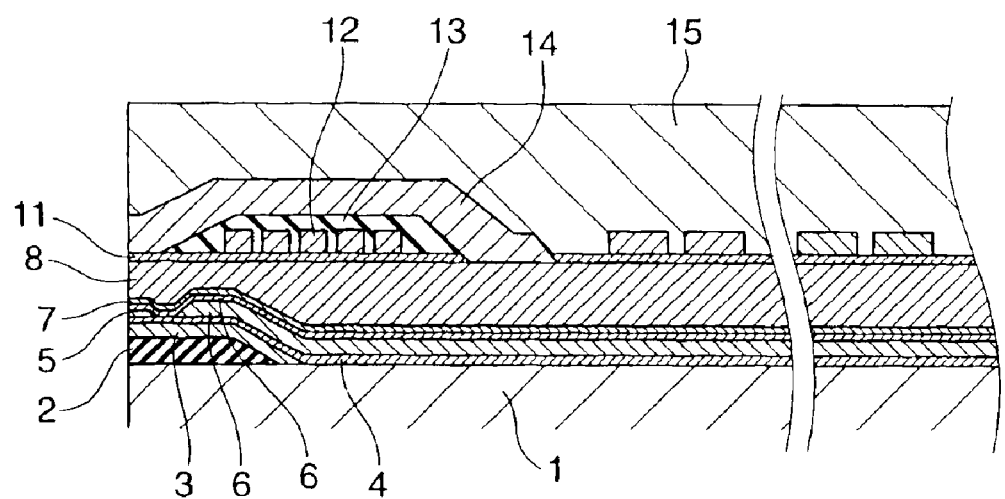
FIG. 2 shows a section of a recording/reproducing separated type head, which is a second preferred embodiment of the present invention.
Figure 3:
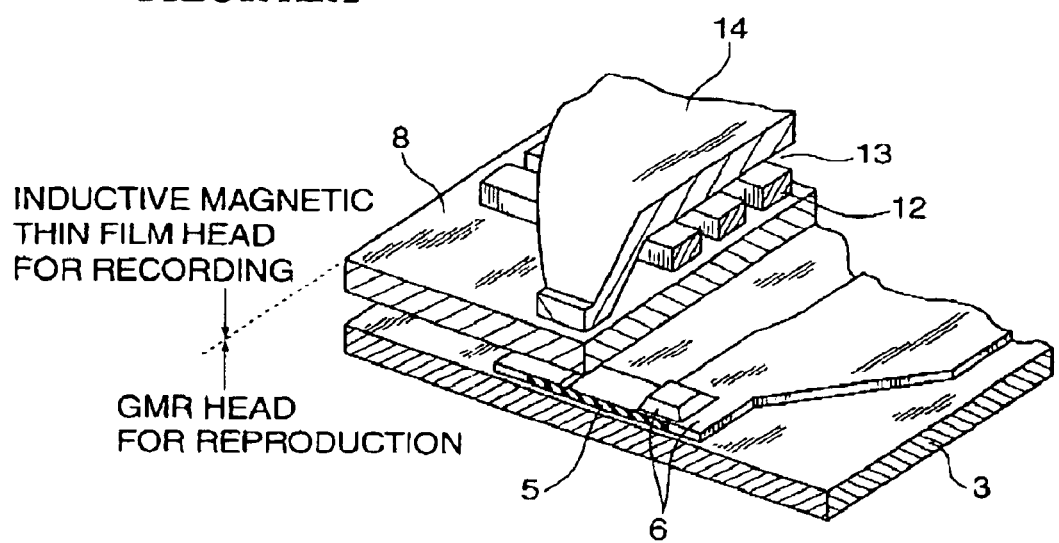
FIG. 3 shows a perspective view of a recording/reproducing separated type head according to the prior art.

Unlike Embodiment 1 described above, which is an upper shield/lower pole separated type head, this embodiment is an upper shield/lower pole merged version of recording/reproducing separated type head as shown in FIG. 2. The upper shield/lower pole merged type head requires more strict control of the manufacturing process than the upper shield/lower pole separated type head described above because its GMR head is more susceptible to the influence of the recording magnetic field. However, as its structure is simpler, the burden on the manufacturing process is smaller, which means a cost advantage as well.

The recording/reproducing separated type head embodying the invention in this mode permits dispensation with steps (10) and (11) in the process for Embodiment 1 described above. The process for this embodiment is the same as that for Embodiment 1 described above in all other respects.

In the head embodying the invention in this mode, the upper shield film 8 also serves as the lower pole 10. Therefore, the inductive magnetic thin film head, which is a source of heat generation, is closer to the substrate 1 than in the separated type, resulting in a superior structure in terms of heat radiation. As in Embodiment 1, the temperature rise in a case where a current of 100 MHz and 30 mAp-p is flowed to the coil 12 is 14° C. less than in the presence of the insulating film 2. The effect is even more significant where a current of 400 MHz and 30 mAp-p is applied, a reduction by 17.3° C. being achieved. An improvement by around 2° C. over the separated type is observed.

[Embodiment 3]

Embodiment 1 and Embodiment 2 described above have structures in which most of the insulating film 2 over the substrate 1 is removed. However, the GMR head is supplied with sense currents from the electrodes 6. For this reason, if the electrodes 6 are electrically connected to the substrate 1, the sense currents will be shunted, resulting in a drop in electrical output.

To solve this problem, it is effective to thicken the insulating film 2 between the electrodes 6 and the substrate 1. Needless to mention, this is done without sacrificing the high level of heat radiation, which is an object of the present invention.

Figure 8:
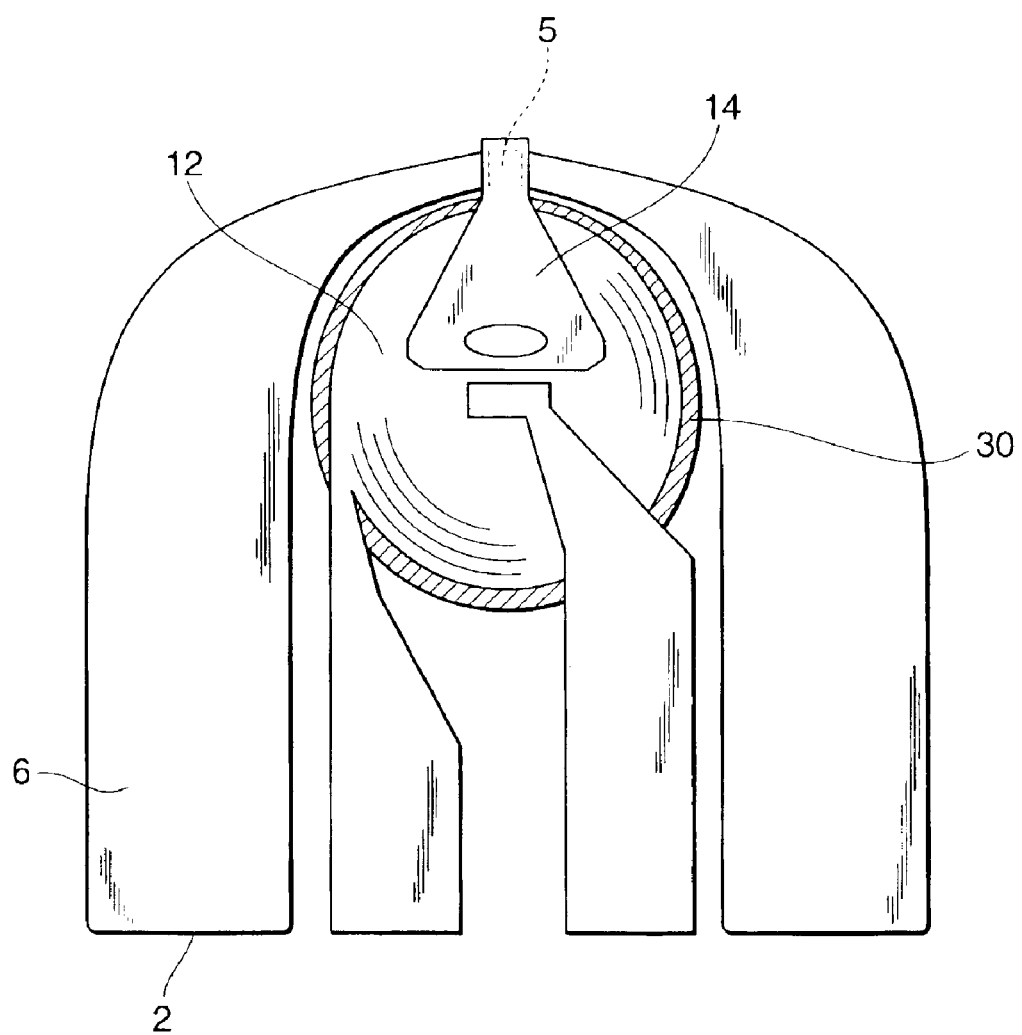
FIG. 8 shows a plan of a recording/reproducing separated type head, which is a third preferred embodiment of the present invention.

FIG. 8 schematically illustrates this embodiment, wherein the head is viewed from the upper pole 14 side.

The electrodes 6 are given such a size and positions that they may not cross the coil 12. The insulating film 2 is removed only underneath the coil 12 or in the area slightly larger than the coil 12 (insulating film-removed area 30). By contrast, the insulating film 2 is left underneath the electrodes 6. As this results in separation of the electrodes 6 and the substrate 1 from each other by an $Al_2O_3$ film of a few $\mu$m in thickness, a high level of electrical insulation is secured, making it possible to prevent the output from being reduced by the shunting of the sense currents.

[Embodiment 4]

In Embodiment 1, Embodiment 2 and Embodiment 3 described above, the insulating film 2 is supposed to be 3 $\mu$m thick. However, in order to further increase heat radiation, it is desirable for the insulating film 2 underneath the GMR film 5 to be even thinner. In this embodiment, the thickness is 0.5 $\mu$m. This can reduce the temperature rise by additional 0.3° C. Although the insulating film 2 is 0.5 $\mu$m thick in this embodiment, if the thickness is no more than 1 $\mu$m, a similar effect to this embodiment can be achieved.

As hitherto described, the present invention enables heat generated by the inductive magnetic thin film head to be efficiently radiated to the substrate 1. This makes it possible to reduce the temperature rise of the head by about 12.5° C. to 17.3° C. under conditions of 100 to 400 MHz and 30 mAp-p. As a result, the deformation quantity d (see FIG. 6) of the deformed portion 20 of the head is successfully reduced from the previous 12 nm to 5 nm.

A magnetic head according to the prior art having a flying height of 12 nm, for instance, is in contact with the recording medium in its bottom position. However, according to the invention, a flying height of 7 nm or more can be secured even at the time of recording, greatly contributing to the prevention of sliding between the magnetic head and the recording medium. More specifically, while the frequency of sliding trouble with heads of the convention structure is 0.05 case/1000 units/1000 hours, the frequency with the present invention is reduced to 0.008 case/1000 units/1000 hours.

What is claimed is:

1. A recording/reproducing separated type head comprising:

a magnetoresistive type head having, between a lower shield and an upper shield, provided over a substrate, a magnetoresistive film and a pair of electrodes electrically connected to the magnetoresistive film, an inductive magnetic thin film head having, between a lower pole and an upper pole, provided over the upper shield of the magnetoresistive type head via an insulating film, a gap film and a coil via an interlayer insulator, and an insulating film provided between said substrate and said lower shield and in the vicinity of said magnetoresistive film.

wherein said lower shield is provided on said insulating film over said substrate, and the insulating film provided over said substrate is absent in an area underneath said coil.

2. The recording/reproducing separated type head according to claim 1, wherein:

the insulating film provided over said substrate is not more than 1 $\mu$m in thickness.

3. A recording/reproducing separated type head comprising:

a magnetoresistive type head having, between a lower shield and an upper shield, provided over a substrate, a magnetoresistive film and a pair of electrodes electrically connected to the magnetoresistive film;

an inductive magnetic thin film head having, between a lower pole and an upper pole, provided over the upper shield of the magnetoresistive type head via an insulating film, a gap film and a coil via an interlayer insulator; and an insulating film provided between said substrate and said lower shield and in the vicinity of said magnetoresistive film; wherein the insulating film provided between said substrate and said lower shield is absent in an area underneath said coil.

4. The recording/reproducing separated type head according to claim 3, wherein:

the insulating film provided between said substrate and said lower shield is not more than 1 $\mu$m in thickness.

5. The recording/reproducing separated type head wherein comprising:

a magnetoresistive type head having, between a lower shield and an upper shield, provided over a substrate, a magnetoresistive film and a pair of electrodes electrically connected to the magnetoresistive film;

an inductive magnetic thin film head using said upper shield of the magnetoresistive effect type head also as a lower pole and having, between the upper shield-cum-lower pole and an upper pole, a gap film and a coil via an interlayer insulator; and an insulating film provided between said substrate and said lower shield and in the vicinity of said magnetoresistive film;

wherein said lower shield is provided over said insulating film and said insulating film is absent in an area underneath said coil.

6. The recording/reproducing separated type head according to claim 5, wherein:

said insulating film is not more than 1 $\mu$m in thickness.

7. A recording/reproducing separated type head comprising:

a magnetoresistive type head having, between a lower shield and an upper shield, provided over a substrate, a magnetoresistive film and a pair of electrodes electrically connected to the magnetoresistive film;

an inductive magnetic thin film head using said upper shield of the magnetoresistive effect type head also as a lower pole and having, between the upper shield-cum-lower pole and an upper pole, a gap film and a coil via an interlayer insulator; and an insulating film provided between said substrate and said lower shield and in the vicinity of said magnetoresistive film, wherein the insulated film provided between said substrate and said lower shield is absent in an area underneath said coil.

8. The recording/reproducing separated type head according to claim 7, wherein:

the insulating film provided between said substrate and said lower shield is not more than 1 $\mu$m in thickness.

* * * * *